(12) United States Patent
Shimma

(10) Patent No.: US 12,526,510 B2
(45) Date of Patent: Jan. 13, 2026

(54) ELECTRONIC DEVICE AND CONTROL METHOD THEREOF

(71) Applicant: CANON KABUSHIKI KAISHA, Tokyo (JP)

(72) Inventor: Naoki Shimma, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 18/479,970

(22) Filed: Oct. 3, 2023

(65) Prior Publication Data

US 2024/0129622 A1 Apr. 18, 2024

(30) Foreign Application Priority Data

Oct. 13, 2022 (JP) .................... 2022-164983

(51) Int. Cl.
*H04N 23/63* (2023.01)

(52) U.S. Cl.
CPC ......... *H04N 23/632* (2023.01); *H04N 23/633* (2023.01)

(58) Field of Classification Search
CPC ............... H04N 5/2259; H04N 5/2258; H04N 5/23245; H04N 5/23296; H04N 5/2628; H04N 23/62; H04N 23/667; H04N 23/632; H04N 23/633
See application file for complete search history.

(56) References Cited

U.S. PATENT DOCUMENTS

2017/0336598 A1* 11/2017 Yu ............................. G02B 7/08
2019/0208142 A1* 7/2019 Kitaya ................... H04N 23/63
2021/0075969 A1* 3/2021 Liu ....................... H04N 23/667

FOREIGN PATENT DOCUMENTS

| | | |
|---|---|---|
| JP | 2010-193196 A | 9/2010 |
| JP | 2016048306 A | 4/2016 |
| JP | 2016122930 A | 7/2016 |
| JP | 2016127525 A | 7/2016 |
| JP | 2019164423 A | 9/2019 |
| JP | 2020005208 A | 1/2020 |
| JP | 2022136601 A | 9/2022 |
| KR | 20160127339 A | 11/2016 |
| WO | 2021255975 A | 12/2021 |

OTHER PUBLICATIONS

The above Foreign Patent Documents were cited in a Japanese Office Action that issued on Aug. 27, 2024, of which is enclosed, with a machine translation, that issued in the corresponding Japanese Patent Application No. 2022-164983.
The above foreign patent documents were cited in the May 21, 2024 Japanese Office Action, of which is enclosed without an English Translation, that issued in Japanese Patent Application No. 2022-164983.

* cited by examiner

*Primary Examiner* — Xi Wang
(74) *Attorney, Agent, or Firm* — Cowan, Liebowitz & Latman, P.C.

(57) ABSTRACT

An electronic device according to the present invention includes at least one memory and at least one processor which function as: a control unit configured to perform control so as to display a setting screen on a display in response to a specific operation on the electronic device, wherein under specific circumstances, the control unit performs control so as to switch setting values that are settable on the setting screen, in response to the specific operation.

22 Claims, 7 Drawing Sheets

ELECTRONIC DEVICE AND CONTROL METHOD THEREOF

BACKGROUND OF THE INVENTION

Field of the Invention

The present invention relates to an electronic device and a control method thereof and to a technique that activates a function in response to an operation with respect to an operation member.

Description of the Related Art

Techniques are proposed for changing (customizing), according to a user's preference, a function that is activated in response to an operation with respect to an operation member (for example, a button or a dial). Japanese Patent Application Laid-open No. 2010-193196 discloses a technique for guiding an operation of a main body-side operating unit when the main body-side operating unit is operated and for guiding an operation of a remote control apparatus when the remote control apparatus is operated.

However, with conventional art, a function not suitable for a user may end up being activated depending on circumstances when activating a function in response to a specific operation. For example, the conventional technique disclosed in Japanese Patent Application Laid-open No. 2010-193196 merely involves selectively performing one of a guidance of an operation of the main body-side operating unit and a guidance of an operation of the remote control apparatus. Therefore, even if a function that is activated in response to a specific operation is suitable for a user who mainly operates the main body-side operating unit, the function may not be suitable for a user who mainly operates the remote control apparatus.

SUMMARY OF THE INVENTION

The present invention provides an electronic device capable of activating a function that is suitable for a user in response to a specific operation.

An electronic device according to the present invention includes at least one memory and at least one processor which function as: a control unit configured to perform control so as to display a setting screen on a display in response to a specific operation on the electronic device, wherein under specific circumstances, the control unit performs control so as to switch setting values that are settable on the setting screen, in response to the specific operation.

Further features of the present invention will become apparent from the following description of exemplary embodiments with reference to the attached drawings.

DESCRIPTION OF THE EMBODIMENTS

Figure 1A:
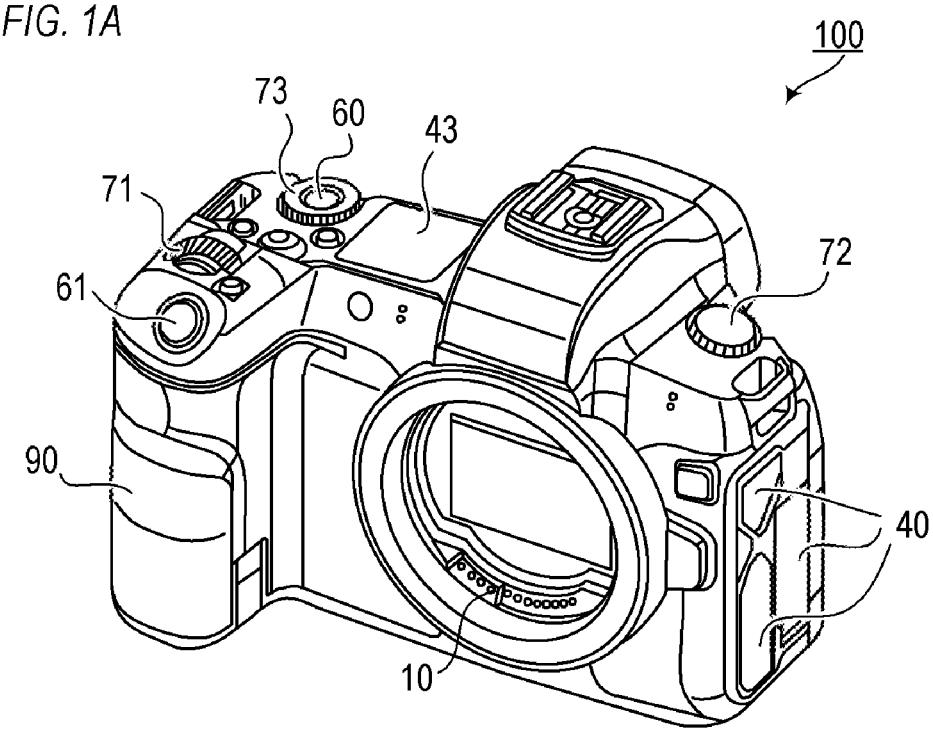
FIGS. 1A and 1B are external views of a digital camera.
Figure 1B:
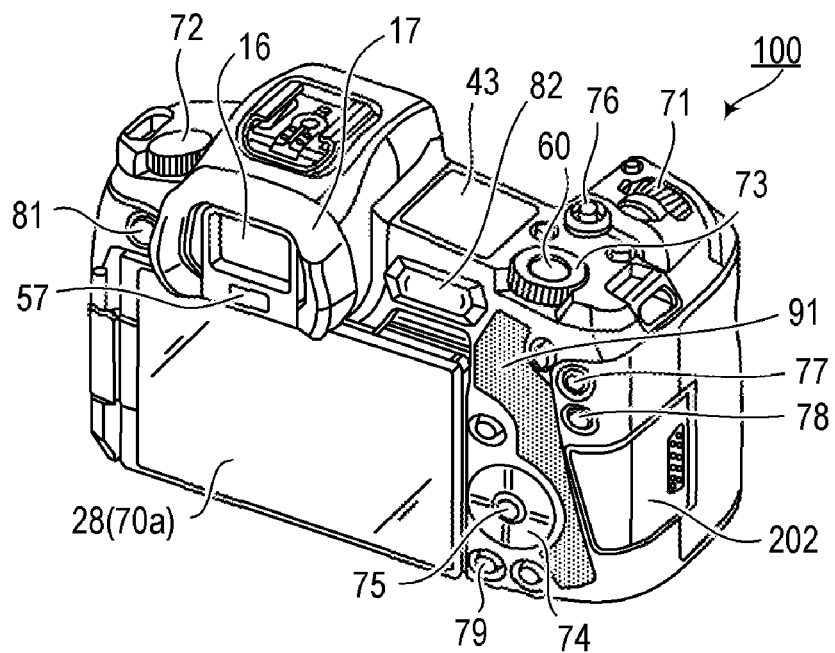

Hereinafter, an embodiment of the present invention will be described with reference to the drawings. FIGS. 1A and 1B show external views of a digital camera 100 as an example of an apparatus (electronic device) to which the present invention can be applied. FIG. 1A is a front perspective view of the digital camera 100, and FIG. 1B is a rear perspective view of the digital camera 100.

A display unit 28 is a display unit provided on a rear surface of the digital camera 100 for displaying images and various types of information. For example, the display unit 28 displays a setting screen when activating a setting screen function (to be described later) or displays a switched setting value (a setting value that can be set on a setting screen) when activating a setting toggle function (to be described later). A touch panel 70a is capable of detecting touch operations with respect to a display surface (a touch operation surface) of the display unit 28. A finder outer display unit 43 is a display unit provided on a top surface of the digital camera 100 for displaying various setting values of the digital camera 100 such as a shutter speed and an aperture. A shutter button 61 is an operating member for issuing a photograph instruction. A mode changeover switch 60 is an operating member for switching between various modes. A terminal cover 40 is a cover for protecting a connector (not illustrated) to which is connected a connection cable or the like for connecting the digital camera 100 to an external device.

A main electronic dial 71 is a rotating operating member and, by turning the main electronic dial 71, setting values such as a shutter speed and an aperture can be changed. A power supply switch 72 is an operating member for switching power of the digital camera 100 on and off. A sub electronic dial 73 is a rotating operating member and, by turning the sub electronic dial 73, operations such as moving a selection frame (cursor) and image feeding can be performed. A four-way key 74 is configured such that upper, lower, left, and right portions thereof are respectively depressible, and enables processing corresponding to a depressed portion of the four-way key 74 to be performed. In a state where the setting screen is being displayed on the display unit 28, the four-way key 74 is used to change a selected item (move a cursor for selecting an item) within the setting screen. A SET button 75 is a push button mainly used to determine a selected item. A determination of a selected item within the setting screen is also performed using the SET button 75.

A moving image button 76 is used to issue instructions to start and stop moving image photography (recording). An AE lock button 77 is a push button, and by depressing the AE lock button 77 in a photography standby state, an exposure state can be fixed. An enlargement button 78 is an operation button for switching an enlargement mode on and off in a live view display (LV display) in a photography mode. By operating the main electronic dial 71 after switching on the enlargement mode, a live view image (LV image) can be enlarged or reduced. In a playback mode, the enlargement button 78 functions as an operation button for enlarging a reproduced image or increasing an enlargement rate of the reproduced image. A playback button 79 is an operation button for switching between the photography mode and the playback mode. By depressing the playback button 79 in the photography mode, a transition can be made to the playback mode and a latest image among images recorded in a recording medium 200 (to be described later) can be displayed on the display unit 28. A menu button 81 is a push button used for performing an instruction operation to display a menu screen and, when the menu button 81 is depressed, a menu screen enabling various settings is displayed on the display unit 28. The user can intuitively perform various settings using the menu screen displayed on the display unit 28 together with the four-way key 74 and the SET button 75. By changing settings within the menu screen, the user can change (customize) functions assigned to operation members (a button, a rotating operation member, and the like).

A touch bar 82 is a linear touch operating member (line touch sensor) capable of accepting a touch operation. The touch bar 82 is arranged at a position where a touch operation can be performed on the touch bar 82 (where the touch bar 82 is touchable) by the thumb of the right hand in a state where a grip portion 90 is gripped by the right hand (a state where the grip portion 90 is gripped by the little finger, the ring finger, and the middle finger of the right hand) so that the shutter button 61 can be depressed by the index finger of the right hand. In other words, the touch bar 82 is arranged at a position where the touch bar 82 is operable in a state (a photography posture) of bringing an eye into contact with an eyepiece 16 and looking into an eyepiece finder 17 and holding the digital camera 100 so that the shutter button 61 can be pressed at any time. The touch bar 82 is an accepting unit capable of accepting a tap operation (an operation involving touching and releasing without moving a touch position within a predetermined period of time), leftward and rightward slide operations (operations involving touching and moving the touch position while maintaining the touch), and the like with respect to the touch bar 82. The touch bar 82 is an operating member that differs from the touch panel 70a and is not equipped with a display function. For example, the touch bar 82 functions as a multi-function bar (M-Fn bar) to which various functions are assignable.

A communication terminal 10 is a communication terminal used by the digital camera 100 to communicate with a lens unit 150 (to be described later; attachable and detachable). The eyepiece 16 is an eyepiece of the eyepiece finder 17 (a look-in finder), and the user can visually confirm, via the eyepiece 16, an image displayed on an internal EVF 29 (to be described later; electronic view finder). An eye proximity detecting unit 57 is an eye proximity detection sensor that detects whether or not an eye of the user (photographer) is in proximity to the eyepiece 16. A lid 202 is a lid of a slot in which the recording medium 200 (to be described later) is stored. The grip portion 90 is a holding portion configured in a shape that can be readily gripped by the user with the right hand when holding the digital camera 100. The shutter button 61 and the main electronic dial 71 are arranged at positions where the shutter button 61 and the main electronic dial 71 can be operated by the index finger of the right hand in a state where the digital camera 100 is held by gripping the grip portion 90 with the little finger, the ring finger, and the middle finger of the right hand. In addition, the sub electronic dial 73 and the touch bar 82 are arranged at positions where the sub electronic dial 73 and the touch bar 82 can be operated by the right thumb in a same state. A thumb rest portion 91 (a thumb standby position) is a grip portion provided at a location where the thumb of the right hand gripping the grip portion 90 can be readily placed on a rear side of the digital camera 100 in a state where none of the operating members are being operated. The thumb rest portion 91 is constituted by a rubber member or the like in order to enhance holding force (grip feeling).

Figure 2:
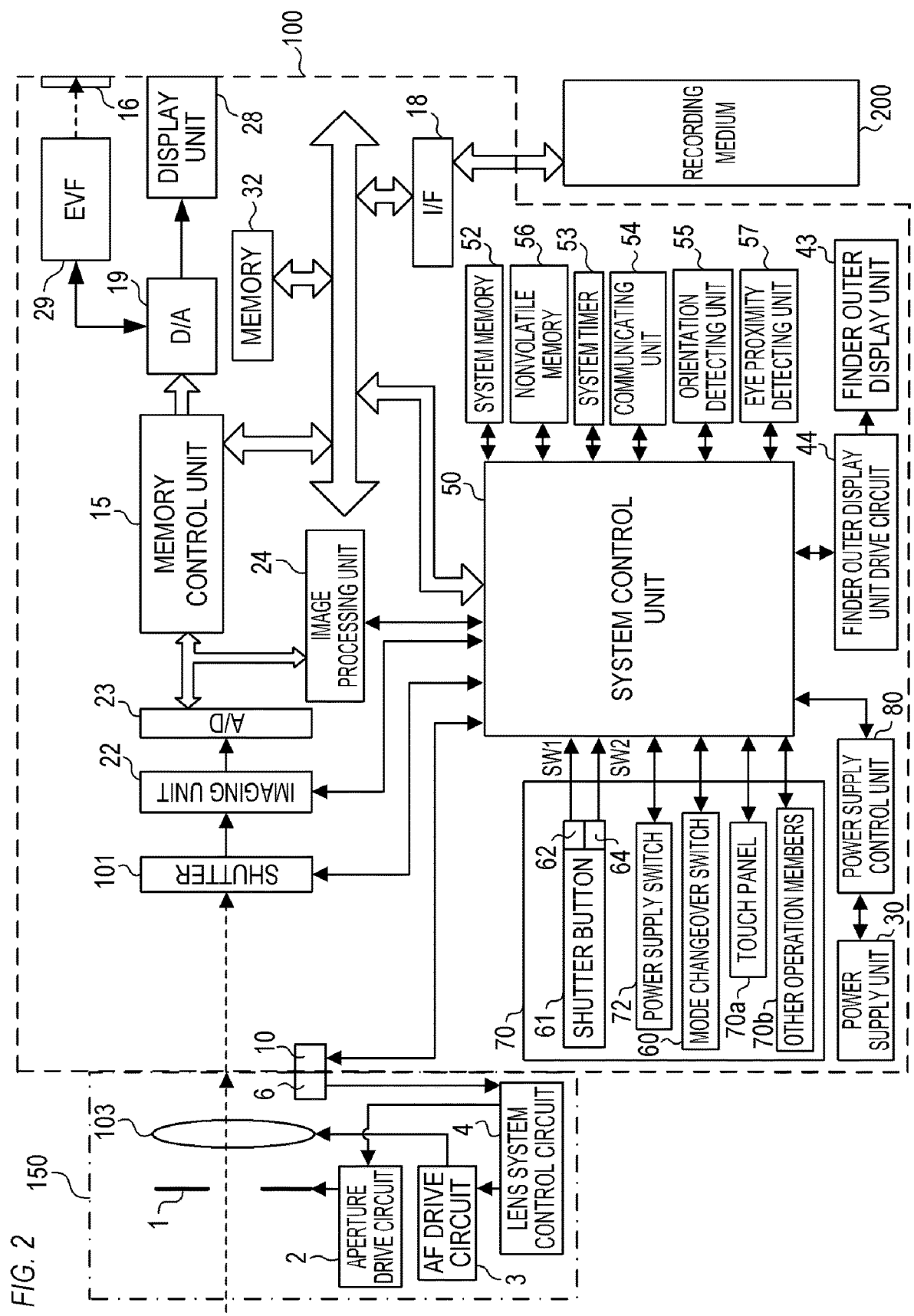
FIG. 2 is a block diagram of the digital camera.

FIG. 2 is a block diagram showing a configuration of the digital camera 100. The lens unit 150 is a lens unit mounted with a replaceable photographing lens. While a lens 103 is usually configured by a plurality of lenses, in FIG. 2, the lens 103 is shown with only one lens in a simplified manner. A communication terminal 6 is a communication terminal used by the lens unit 150 to communicate with the digital camera 100, and the communication terminal 10 is a communication terminal used by the digital camera 100 to communicate with the lens unit 150. The lens unit 150 communicates with a system control unit 50 via the communication terminals 6 and 10. In addition, the lens unit 150 controls an aperture 1 via an aperture drive circuit 2 using an internal lens system control circuit 4. Furthermore, the lens unit 150 performs focusing by displacing the lens 103 via an AF drive circuit 3 using the lens system control circuit 4.

A shutter 101 is a focal plane shutter capable of freely controlling an exposure time of an imaging unit 22 under the control of the system control unit 50.

The imaging unit 22 is an imaging element (an image sensor) constituted by a device such as a CCD or a CMOS which converts an optical image into an electrical signal. The imaging unit 22 may have an imaging surface phase difference sensor that outputs information on a defocusing amount to the system control unit 50. An A/D converter 23 converts an analog signal output from the imaging unit 22 into a digital signal.

An image processing unit 24 performs predetermined processing (pixel interpolation, resizing processing such as reduction, color conversion processing, and the like) on data from the A/D converter 23 or data from a memory control unit 15. In addition, the image processing unit 24 performs predetermined arithmetic calculation processing using image data of a sensed image, and the system control unit 50 performs exposure control and ranging control based on an arithmetic calculation result obtained by the image processing unit 24. Accordingly, processing such as AF (automatic focusing) processing, AE (automatic exposure) processing, and EF (preliminary light emission before flash) processing in a TTL (through-the-lens) system are performed. The image processing unit 24 further performs predetermined arithmetic calculation processing using image data of a sensed image and performs AWB (automatic white balance) processing in the TTL system on the basis of an obtained arithmetic calculation result.

The memory control unit 15 controls transmission/reception of data among the A/D converter 23, the image processing unit 24, and a memory 32. Output data from the A/D converter 23 is written into the memory 32 via the image processing unit 24 and the memory control unit 15. Alternatively, output data from the A/D converter 23 is written into the memory 32 via the memory control unit 15 without involving the image processing unit 24. The memory 32 stores image data obtained by the imaging unit 22 and converted into digital data by the A/D converter 23 and image data to be displayed on the display unit 28 and the EVF 29. The memory 32 has sufficient storage capacity for storing a predetermined number of still images and a predetermined time's worth of moving images and audio.

In addition, the memory 32 also doubles as a memory (a video memory) for image display. A D/A converter 19 converts image data for display stored in the memory 32 into an analog signal and supplies the display unit 28 and the EVF 29 with the analog signal. In this manner, image data for display having been written into the memory 32 is displayed by the display unit 28 and the EVF 29 via the D/A converter 19. Each of the display unit 28 and the EVF 29 is a display such as an LCD, an organic EL, or the like which performs display in accordance with an analog signal from the D/A converter 19. A live view display (LV) can be performed by converting digital signals subjected to A/D conversion by the A/D converter 23 and accumulated in the memory 32 into analog signals with the D/A converter 19, and sequentially transmitting the analog signals to the display unit 28 or the EVF 29 and displaying the analog signals. Hereinafter, an image displayed in live view display will be referred to as a live view image (LV image).

The system control unit 50 is a control unit constituted by at least one processor and/or at least one circuit and controls the entire digital camera 100. The system control unit 50 realizes the respective steps of processing of the present embodiment (to be described later) by executing a program recorded in a nonvolatile memory 56. In addition, the system control unit 50 also performs display control by controlling the memory 32, the D/A converter 19, the display unit 28, the EVF 29, and the like.

A system memory 52 is, for example, a RAM, and the system control unit 50 deploys constants and variables for the operations of the system control unit 50, the program read from the nonvolatile memory 56, and the like onto the system memory 52.

The nonvolatile memory 56 is an electrically erasable and recordable memory and is, for example, an EEPROM. Constants, a program, and the like necessary for operations of the system control unit 50 are recorded in the nonvolatile memory 56. In this case, the program refers to a program for executing the various flow charts to be described later in the present embodiment. In addition, settings that can be changed on the menu screen are also recorded in the nonvolatile memory 56. For example, information on functions assigned to operation members is recorded.

A system timer 53 is a time-measuring unit for measuring time used in various controls and measuring time according to an internal clock.

A communicating unit 54 transmits and receives video signals and audio signals to and from an external device connected wirelessly or by a wired cable. The communicating unit 54 is also capable of connecting to a wireless LAN (Local Area Network) or the Internet. In addition, the communicating unit 54 is also capable of communicating with the external device via Bluetooth (registered trademark) or Bluetooth Low Energy. The communicating unit 54 is capable of transmitting images (including LV images) sensed by the imaging unit 22 and images recorded on the recording medium 200 and receiving image data and various other types of information from the external device. Furthermore, when an operation member is provided in the external device, the system control unit 50 receives, via the communicating unit 54, a signal in accordance with an operation with respect to the operation member of the external device and controls each unit of the digital camera 100 in accordance with the received signal. Accordingly, the digital camera 100 can be remotely operated. For example, when an operation with respect to the operation member of the external device is detected, a setting screen function (to be described later) or a setting toggle function (to be described later) is activated.

An orientation detecting unit 55 detects an orientation of the digital camera 100 relative to a direction of gravitational force. Based on the orientation detected by the orientation detecting unit 55, a determination can be made as to whether an image photographed by the imaging unit 22 is an image photographed while holding the digital camera 100 horizontally or an image photographed while holding the digital camera 100 vertically. The system control unit 50 can add orientation information in accordance with the orientation detected by the orientation detecting unit 55 to an image file of the image sensed by the imaging unit 22, record a rotated version of the image, and the like. An acceleration sensor, a gyro sensor, or the like can be used as the orientation detecting unit 55. A motion (pan, tilt, uplift, whether stationary or not, and the like) of the digital camera 100 can also be detected using the acceleration sensor or the gyro sensor that constitutes the orientation detecting unit 55.

The eye proximity detecting unit 57 is an eye proximity detection sensor which detects (approach detection) an approach (eye approach) and a separation (eye separation) of an eye (object) with respect to the eyepiece 16 of the eyepiece finder 17 (hereinafter, simply referred to as a "finder"). The system control unit 50 switches between setting the display unit 28 and the EVF 29 to display (displayed state) and hide (hidden state) in accordance with the state detected by the eye proximity detecting unit 57. More specifically, at least when a present state is the photography standby state and when a setting of switching of display destinations is automatic switching, the display unit 28 as the display destination is set to display and the EVF 29 is set to hide when not approached by the eye. In addition, during an eye approach, the EVF 29 as the display destination is set to display and the display unit 28 is set to hide. As the eye proximity detecting unit 57, for example, an infrared proximity sensor can be used to detect an approach of any object with respect to the eyepiece 16 of the finder 17 incorporating the EVF 29. When an object approaches, infrared light projected from a light projecting portion (not illustrated) of the eye proximity detecting unit 57 is reflected by the object and received by a light receiving portion (not illustrated) of the infrared proximity sensor. Based on an amount of received infrared light, how close the object is from the eyepiece 16 (eye proximity distance) can also be determined. In this manner, the eye proximity detecting unit 57 performs eye proximity detection in which a distance of approach by an object with respect to the eyepiece 16 is detected. An eye approach is to be detected when an object having approached the eyepiece 16 to within a predetermined distance from an eye-unapproached state (unapproached state) is detected. An eye separation is to be detected when an object of which an approach has been detected recedes to a predetermined distance or more from an eye-approached state (approached state) is detected. A threshold for detecting an eye approach and a threshold for detecting an eye separation may differ from each other by, for example, providing a hysteresis. In addition, after detecting an eye approach, an eye-approached state is assumed until an eye separation is detected. After detecting an eye separation, an eye-unapproached state is assumed until an eye approach is detected. It should be noted that an infrared proximity sensor is simply an example and other sensors may be adopted as the eye proximity detecting unit 57 as long as a state which can be regarded as an eye approach can be detected.

Various setting values of the camera including a shutter speed and an aperture are displayed on the finder outer display unit 43 via a finder outer display unit drive circuit 44.

A power supply control unit 80 is constituted by a battery detection circuit, a DC-DC converter, a switching circuit for switching between blocks to be energized, and the like, and detects whether or not a battery is mounted, a type of the battery, a remaining battery level, and the like. In addition, the power supply control unit 80 controls the DC-DC converter on the basis of the detection results and an instruction from the system control unit 50 and supplies respective units including the recording medium 200 with necessary voltage for a necessary period of time. A power supply unit 30 is constituted by a primary battery such as an alkaline battery or a lithium battery, a secondary battery such as a NiCd battery, a NiMH battery, or a Li battery, an AC adapter, or the like.

A recording medium I/F 18 is an interface with the recording medium 200 that is a memory card, a hard disk, or the like. The recording medium 200 is a recording medium such as a memory card for recording photographed images and is constituted by a semiconductor memory, a magnetic disk, or the like.

An operating unit 70 is an input unit for accepting an operation (a user operation) by the user and is used to input various operation instructions to the system control unit 50. As shown in FIG. 2, the operating unit 70 includes the mode changeover switch 60, the shutter button 61, the power supply switch 72, the touch panel 70*a*, and other operation members 70*b*. The other operating members 70*b* include the main electronic dial 71, the sub electronic dial 73, the four-way key 74, the SET button 75, the moving image button 76, the AE lock button 77, the enlargement button 78, the playback button 79, the menu button 81, and the touch bar 82. Functions that are activated when the user operates the operation members can be changed by changing settings in the menu screen.

The mode changeover switch 60 switches an operating mode of the system control unit 50 to any of a still image photography mode, a moving image photography mode, a playback mode, and the like. Modes included in the still image photography mode are an automatic photography mode, an automatic scene determination mode, a manual mode, an aperture priority mode (Av mode), a shutter speed priority mode (Tv mode), and a program AE mode (P mode). Other available modes include various scene modes that constitute photography settings for different photography scenes as well as custom modes. Using the mode changeover switch 60, the user can directly switch to any of these modes. Alternatively, after temporarily switching to a photography mode list screen using the mode changeover switch 60, another operating member may be used to selectively switch to any of a plurality of displayed modes. In a similar manner, the moving image photography mode may also include a plurality of modes.

The shutter button 61 includes a first shutter switch 62 and a second shutter switch 64. The first shutter switch 62 is turned on during an operation of the shutter button 61 by a so-called half-press (a photography preparation instruction) and generates a first shutter switch signal SW1. In accordance with the first shutter switch signal SW1, the system control unit 50 starts a photography preparation operation of AF (automatic focus) processing, AE (automatic exposure) processing, AWB (automatic white balance) processing, EF (preliminary light emission before flash) processing, and the like. The second shutter switch 64 is turned on upon completion of an operation of the shutter button 61 by a so-called full-press (a photography instruction) and generates a second shutter switch signal SW2. In accordance with the second shutter switch signal SW2, the system control unit 50 starts a series of operations of photography processing from reading a signal from the imaging unit 22 to writing a sensed image into the recording medium 200 as an image file.

The touch panel 70*a* is a touch sensor for detecting various touch operations with respect to a display surface of the display unit 28 (an operation surface of the touch panel 70*a*). The touch panel 70*a* and the display unit 28 can be integrally constructed. For example, the touch panel 70*a* is configured such that transmittance of light does not obstruct display by the display unit 28 and is mounted to an upper layer of a display surface of the display unit 28. Subsequently, an input coordinate on the touch panel 70*a* and a display coordinate on the display surface of the display unit 28 are associated with each other. Accordingly, a GUI (graphical user interface) can be provided which enables the user to feel as if a screen displayed on the display unit 28 can be directly manipulated.

FIRST EXAMPLE

In a first example, functions that are activated in response to a specific operation are switched between a setting screen function and a setting toggle function. The specific operation is, for example, an operation with respect to an operation member to which the setting screen function is assigned. There may be one or a plurality of operation members to which the setting screen function is assigned. The setting screen function is a function of displaying a setting screen. For example, when the specific operation (an operation with respect to the operation member to which the setting screen function is assigned) is performed, the setting screen is displayed on the display unit 28 (or the EVF 29). In addition, when the specific operation is performed once again, the setting screen is hidden. However, there may be circumstances (specific circumstances) where it is more preferable to provide the user with the setting toggle function than the setting screen function. In consideration thereof, in the first example, under the specific circumstances, the setting toggle function is activated in response to the specific operation. The setting toggle function is a function of switching among setting values by a toggle (so that a plurality of candidates loop in a predetermined order). Specific examples of the specific circumstances will be described in second to sixth examples.

Figure 3:
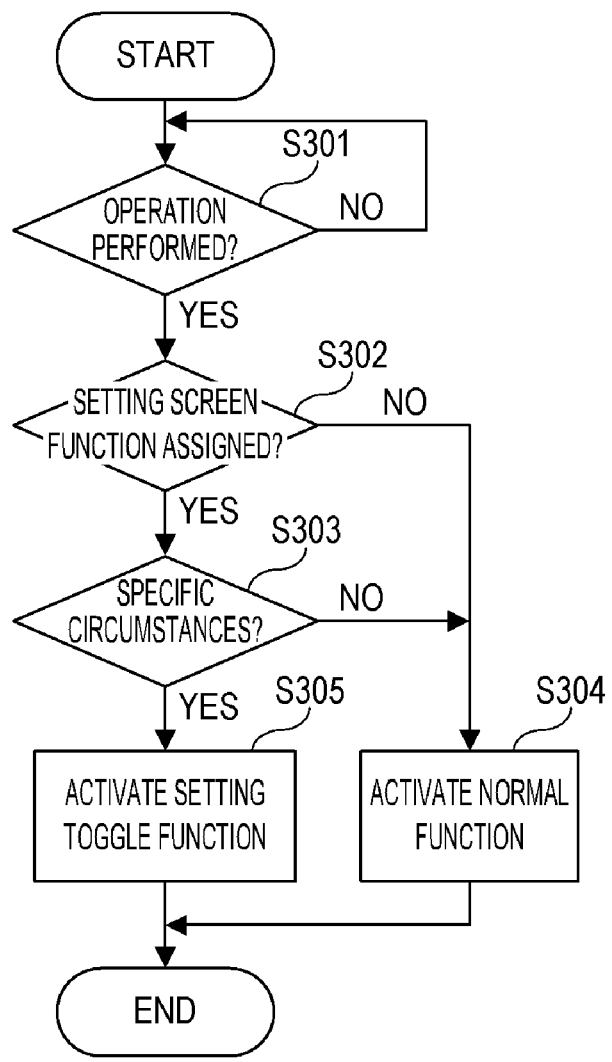
FIG. 3 is a flow chart of photography mode processing according to a first example.

FIG. 3 is a flow chart of photography mode processing according to the first example. The processing is realized as the system control unit 50 deploys a program stored in the nonvolatile memory 56 on the system memory 52 and executes the program. When the user turns on power of the digital camera 100 by operating the power supply switch 72, the system control unit 50 performs necessary activation processing and the like of the respective units. Accordingly, the digital camera 100 assumes a photography standby state and the photography mode processing shown in FIG. 3 is started. The photography standby state is a state where processing in accordance with the first shutter switch signal SW1 and processing in accordance with the second shutter switch signal SW2 can be executed. The photography mode processing shown in FIG. 3 is repetitively performed.

In S301, the system control unit 50 determines whether or not the operating unit 70 has been operated by the user. The system control unit 50 stands by until the operating unit 70 is operated and processing advances to S302 once the operating unit 70 is operated.

In S302, the system control unit 50 determines whether or not the setting screen function is assigned to the operation member operated in S301 among the plurality of operation members included in the operating unit 70. When the setting screen function has been assigned, processing advances to S303, but otherwise advances to S304. As described earlier, the user can change a function that is activated when the user operates an operation member (the function to be assigned to the operation member) by changing settings in the menu screen in advance.

In S303, the system control unit 50 determines whether or not the specific circumstances are in place. When the specific circumstances are in place, processing advances to S305, but otherwise advances to S304. The specific circumstances are circumstances where the setting toggle function is more preferable than the setting screen function and specific examples thereof will be described in the second to sixth examples.

Figure 4:
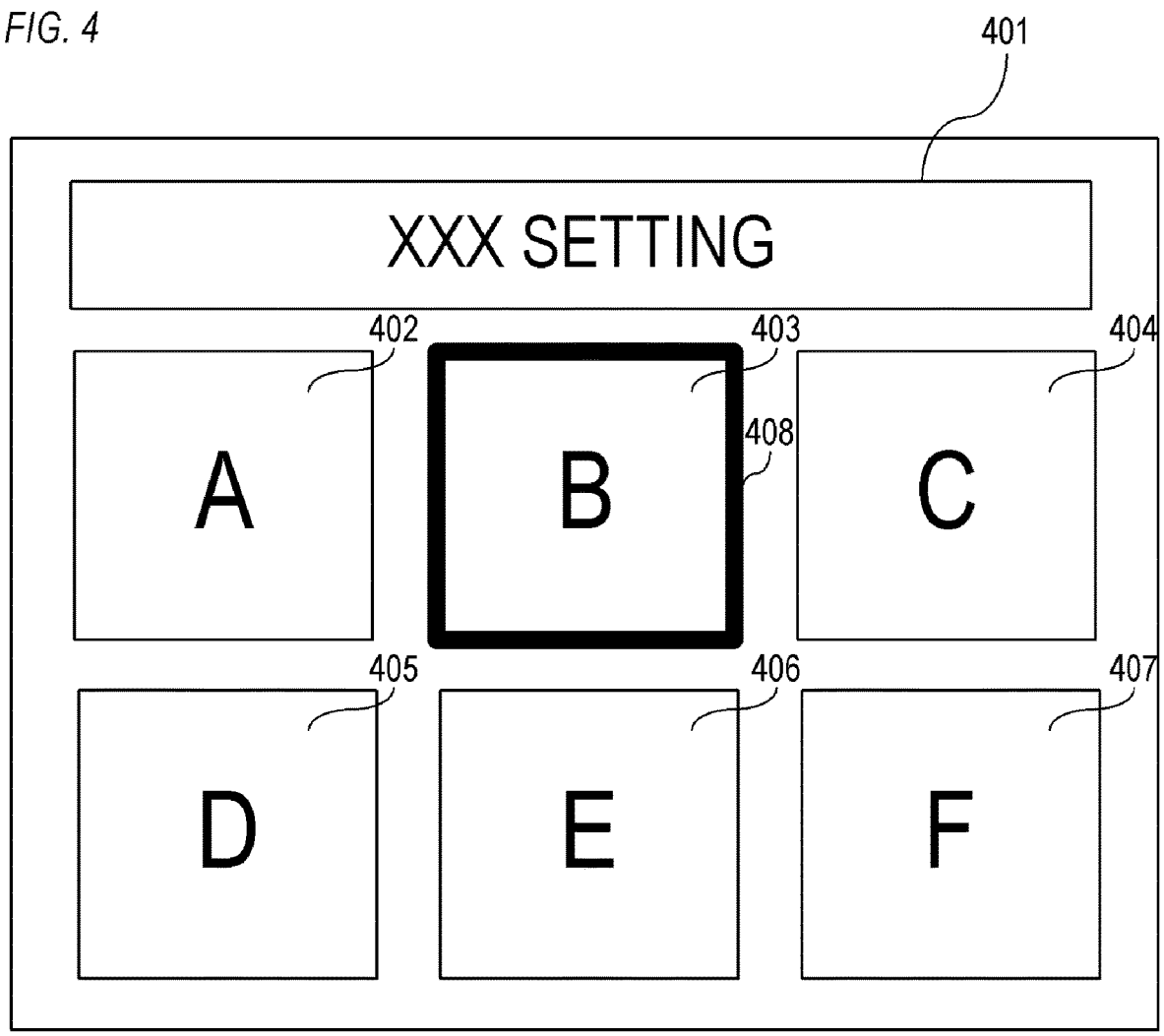
FIG. 4 is a diagram showing a setting screen.

In step S304, the system control unit 50 activates the function (normal function) assigned to the operation member operated in step S301. When the setting screen function is assigned to the operation member operated in step S301, the setting screen function is activated. Due to the setting screen function, for example, the setting screen shown in FIG. 4 is displayed on the display unit 28 (or the EVF 29). The setting screen shown in FIG. 4 includes a setting name 401 indicating a type (setting type) of a setting value that is a switching target (changing target), candidates 402 to 407 of a setting value related to the setting name 401 (setting type), and a selection frame 408 (cursor). The setting type is, for example, an ISO sensitivity, a shutter speed, or an aperture value. In the setting screen shown in FIG. 4, the user can select one (a desired candidate) among a plurality of candidates by operating the four-way key 74. The candidate (selected candidate) selected from the plurality of candidates is indicated by the selection frame 408. By consecutively operating the SET button 75, the user can set the selected candidate as a setting value. However, in this case, a plurality of operation members (the four-way key 74 and the SET button 75) need be used.

Alternatively, the selection frame 408 may indicate a present setting value at the start of display of the setting screen. In addition, a method of identifiably displaying a selected candidate (a method of displaying an enhanced selected candidate) is not limited to the method of using the selection frame 408. For example, the selected candidate can be displayed in a mode (for example, brightness or color) that differs from the other candidates. On the setting screen, the present setting value may be identifiably displayed. In a similar manner to the method of identifiably displaying a selected candidate, the method of identifiably displaying the present setting value is also not particularly limited. For example, a thickness, brightness, or color of a contour line of the present setting value may be differentiated from that of the other candidates.

In S305, the system control unit 50 activates the setting toggle function. Therefore, when the user repetitively performs the specific operation, the setting values are switched every time the specific operation is performed. For example, when the operation member for the specific operation is a button, the setting values are switched every time the button is depressed, and when the operation member is a rotating operation member, the setting values are switched every time the rotating operation member is rotated by a predetermined angle.

Figure 5:
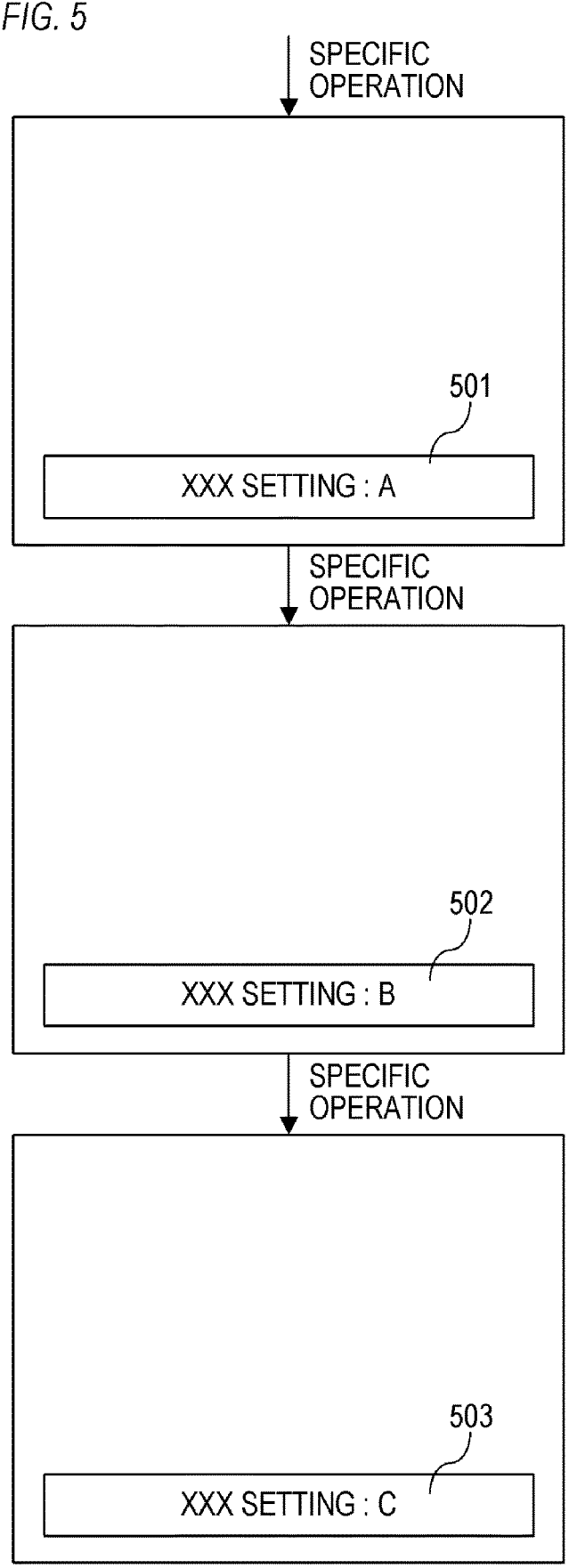
FIG. 5 is a diagram showing a display by a setting toggle function.

Note that the system control unit 50 may display items 501 to 503 shown in FIG. 5 on the display unit 28 (or the EVF 29) in order to notify the user that the setting values have been switched. The items 501 to 503 indicate setting values after being switched. For example, a candidate A is set as the setting value (the setting value is switched to the candidate A) in response to a first execution of the specific operation and the item 501 is displayed. A candidate B is set as the setting value (the setting value is switched from the candidate A to the candidate B) in response to a second execution of the specific operation and the item 502 is displayed. A candidate C is set as the setting value (the setting value is switched from the candidate B to the candidate C) in response to a third execution of the specific operation and the item 503 is displayed. The system control unit 50 may display an item indicating the present setting value in response to the first execution of the specific operation without switching setting values and may switch setting values in response to the specific operation having been performed in a state where the item is being displayed.

In addition, while an example of switching setting values in response to the specific operation has been described, setting types may be made switchable. For example, the system control unit 50 may switch setting types (types of setting values that are switching targets (changing targets)) when an operation time of the specific operation is longer than a threshold (for example, 1 to 3 seconds) and may switch setting values when the operation time is shorter than the threshold. Accordingly, the user can select a setting type (for example, an ISO sensitivity, a shutter speed, or an aperture value) by long-pressing a button and switch setting values of the selected setting type by short-pressing the button.

Activating the setting toggle function enables setting values to be switched with one operation member. As a result, the user can readily switch setting values even under specific circumstances such as when there is only a small number of usable operation members. However, in order to restore an original setting value after switching setting values, the specific operation must be repeated a plurality of times and the number of operations may increase in comparison to changing setting values using the four-way key 74 or the like.

According to the first example, the setting screen function is normally activated in response to the specific operation and the setting toggle function is activated under specific circumstances. As a result, a function that is suitable for a user can be activated in response to the specific operation both in normal times and under specific circumstances. For example, a setting value can be changed to a desired value with a small number of operations in normal times and the setting value can be changed (switched) to a desired value using a small number of operation members under specific circumstances.

SECOND EXAMPLE

In circumstances where the user cannot perform an operation with respect to a setting screen when the setting screen function is activated in response to a specific operation, the setting toggle function is preferably activated in response to the specific operation in order to make setting values changeable (switchable). To this end, the specific circumstances (circumstances where the setting toggle function is activated) may be circumstances where the user cannot perform an operation with respect to the setting screen.

THIRD EXAMPLE

When the user takes a selfie, the user turns the digital camera 100 (lens unit 150) to himself/herself. In such circumstances, since the user cannot operate (since it is difficult for the user to operate) operation members (for example, the four-way key 74 and the SET button 75) provided on the rear surface of the digital camera 100, the setting toggle function is preferably activated in response to a specific operation. To this end, the specific circumstances (circumstances where the setting toggle function is activated) may be circumstances where a selfie is to be taken. The circumstances where a selfie is to be taken can be considered an example of the circumstances where the user cannot perform an operation with respect to a setting screen.

A method of detecting the circumstances where a selfie is to be taken is not particularly limited. For example, let us assume that the display unit 28 is connected to the digital camera 100 via a movable part (not illustrated) and an orientation and an angle of the display unit 28 are adjustable. In such a case, the system control unit 50 can detect circumstances where the display unit 28 faces a side of an object (an imaging direction of the digital camera 100) as the circumstances where a selfie is to be taken (specific circumstances).

Note that the system control unit 50 may detect circumstances satisfying a plurality of conditions including the conditions described above requiring that the display unit 28 face the side of the object as the circumstances where a selfie is to be taken. For example, the system control unit 50 may detect circumstances satisfying both the condition described above and a condition that a specific operation member which is readily operable in a state where the user has turned the lens unit 150 toward himself/herself has been operated. The specific operation member is, for example, an operation member (for example, the moving image button 76) arranged on the top surface or a front surface of the digital camera 100. Using a plurality of conditions as conditions for detecting the circumstances where a selfie is to be taken enables detection accuracy of the circumstances where a selfie is to be taken to be improved.

FOURTH EXAMPLE

The user may be able to operate a setting screen by operating the touch panel 70*a* (touch operation surface). In circumstances where a touch operation with respect to the touch panel 70*a* cannot be performed, since the user cannot change a setting value by a touch operation in the setting screen, the setting toggle function is preferably activated in response to a specific operation. Therefore, the specific circumstances (circumstances where the setting toggle function is activated) may be circumstances where the user cannot perform a touch operation with respect to the touch panel 70*a*. The circumstances where the user cannot perform a touch operation with respect to the touch panel 70*a* can be considered an example of the circumstances where the user cannot perform an operation with respect to the setting screen.

A method of detecting the circumstances where the user cannot perform an operation with respect to the touch panel 70*a* is not particularly limited. For example, the user may perform a setting of not accepting a touch operation (a setting that disables a touch operation) in the menu screen for the purpose of misoperation prevention. In such a case, the system control unit 50 can detect the circumstances with a setting of not accepting a touch operation as circumstances where an operation with respect to the touch panel 70*a* cannot be performed. The touch panel 70*a* (the display unit 28) may be attachable/detachable with respect to the digital camera 100. In such a case, the system control unit 50 can detect circumstances where the touch panel 70*a* has been detached from the digital camera 100 as circumstances where an operation with respect to the touch panel 70*a* cannot be performed.

FIFTH EXAMPLE

Operation members provided in an external device capable of communicating with the digital camera 100 are often fewer in numbers than the operation members provided in the digital camera 100 and, with the external device, there may be cases where an operation with respect to a setting screen cannot be performed even if a specific operation can be performed. For example, the external device is a grip apparatus that is attachable/detachable with respect to the digital camera 100 or a device (for example, a remote controller or a smartphone) for remotely operating the digital camera 100. In circumstances where such an external device is used, since the user cannot perform an operation with respect to the setting screen from the external device, the setting toggle function is preferably activated in response to the specific operation. Therefore, the specific circumstances (circumstances where the setting toggle function is activated) may be circumstances where an external device capable of communicating with the digital camera 100 is used. The circumstances where the external device is used can be considered an example of the circumstances where the user cannot perform an operation with respect to the setting screen.

The circumstances where the external device is used may be circumstances where the external device is connected to the digital camera 100 or circumstances where an operation (for example, the specific operation) has been performed with respect to the external device. The connection may be a connection between a terminal of the external device and a terminal of the digital camera 100 or a wireless connection.

In addition, the system control unit 50 may determine whether or not the used external device is an external device capable of performing an operation with respect to the setting screen. For example, the system control unit 50 may determine whether or not the external device has an operation member that corresponds to the four-way key 74 and an operation member that corresponds to the SET button 75. Furthermore, in a case of an external device capable of performing an operation with respect to the setting screen, the system control unit 50 may activate the setting screen function in response to the specific operation with respect to the external device. In a case of an external device where an operation with respect to the setting screen is not possible, the system control unit 50 may activate the setting toggle function in response to the specific operation with respect to the external device. For example, the external device capable of performing an operation with respect to the setting screen is an external device having an operation member that corresponds to the four-way key 74 and an operation member that corresponds to the SET button 75. For example, the external device where an operation with respect to the setting screen is not possible is an external device that does not have at least one of an operation member that corresponds to the four-way key 74 and an operation member that corresponds to the SET button 75.

SIXTH EXAMPLE

While the system control unit 50 may detect each of the plurality of circumstances described in the third to fifth examples as the specific circumstances, the system control unit 50 may detect circumstances that include two or more of the plurality of circumstances as the specific circumstances. For example, the system control unit 50 may detect circumstances where a selfie is to be taken and also where the user is unable to perform a touch operation with respect to the touch panel 70*a* as the specific circumstances (circumstances where the user cannot perform an operation with respect to a setting screen). Accordingly, a detection accuracy of the circumstances where the user cannot perform an operation with respect to the setting screen can be improved.

SEVENTH EXAMPLE

In the first example, an example of switching functions to be activated in response to a specific operation between the setting screen function of displaying a setting screen and the setting toggle function of switching setting values without displaying the setting screen has been described. In a seventh example, an example in which the setting screen is always displayed in response to a first execution of a specific operation (an operation with respect to an operation member to which the setting screen function is assigned) will be described.

Figure 6:
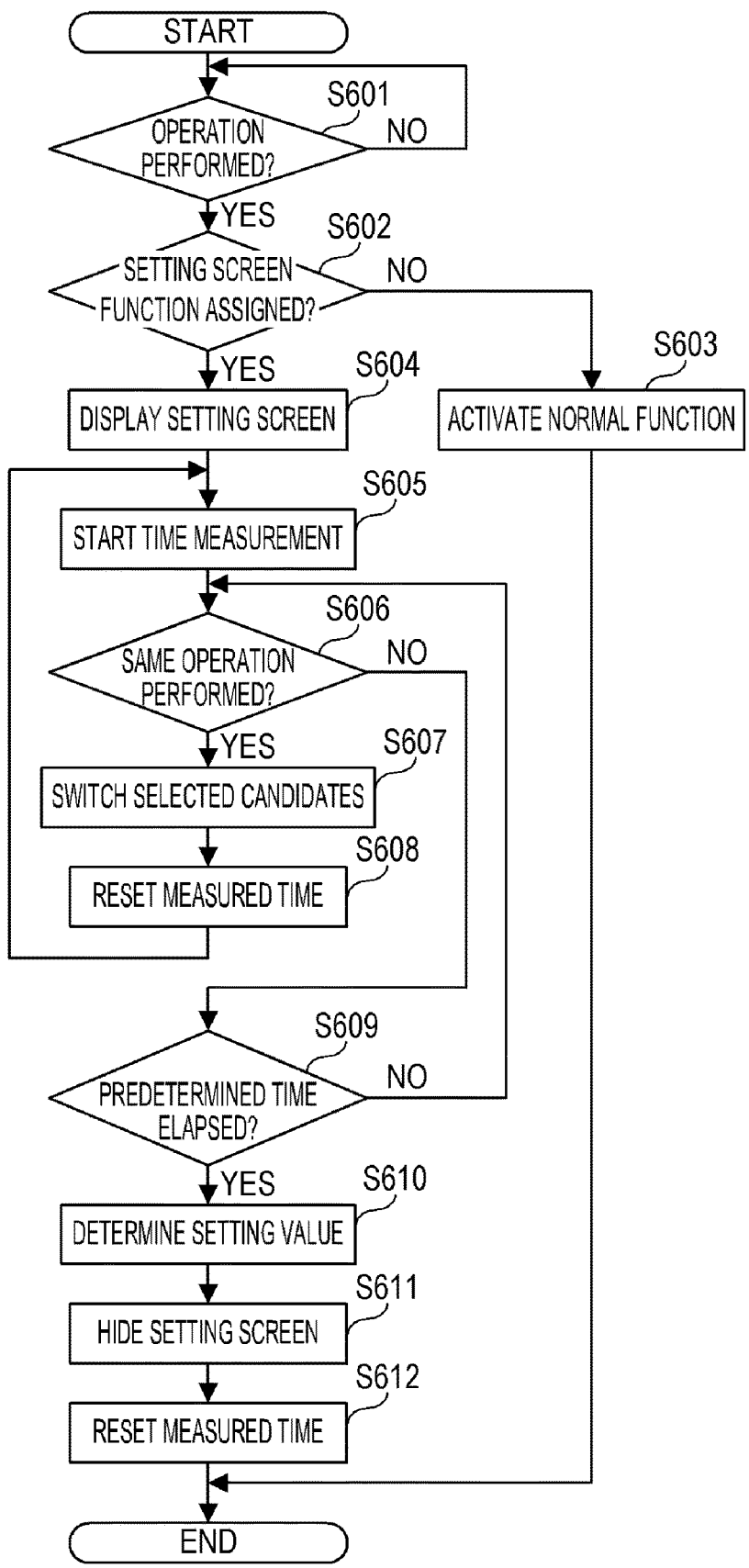
FIG. 6 is a flow chart of photography mode processing according to a seventh example.

FIG. 6 is a flow chart of photography mode processing according to a seventh example. The processing is realized as the system control unit 50 deploys a program stored in the nonvolatile memory 56 on the system memory 52 and executes the program. When the user turns on power of the digital camera 100 by operating the power supply switch 72, the system control unit 50 performs necessary activation processing and the like of the respective units. Accordingly, the digital camera 100 assumes a photography standby state and the photography mode processing shown in FIG. 6 is started. The photography mode processing shown in FIG. 6 is repetitively performed.

The processing of S601 is the same as the processing of S301 according to the first example (FIG. 3), the processing of S602 is the same as the processing of S302 according to the first example (FIG. 3), and the processing of S603 is the same as the processing of S304 according to the first example (FIG. 3). When the setting screen function is assigned to the operation member operated in S601, processing advances from S602 to S604.

In S604, the system control unit 50 displays the setting screen on the display unit 28 (or the EVF 29). The setting screen is the same as that in the first example (FIG. 4).

In S605, the system control unit 50 starts measuring elapsed time from a present time point using the system timer 53.

In S606, the system control unit 50 determines whether or not a same operation member as the operation member operated in S601 has been operated. When the same operation member has been operated, processing advances to S607, but otherwise advances to S609.

Figure 7A:
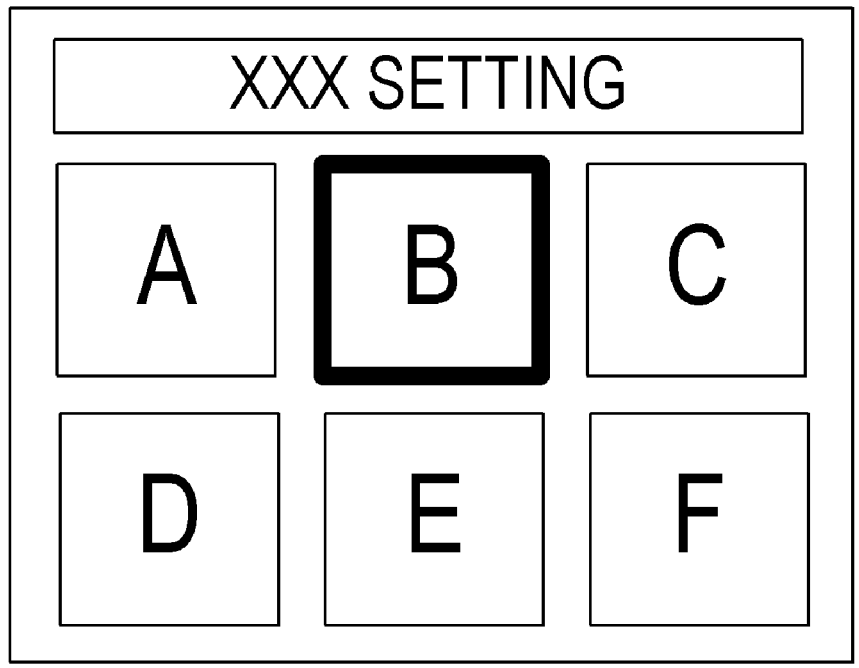
FIGS. 7A and 7B are diagrams showing a transition of a setting screen.
Figure 7B:
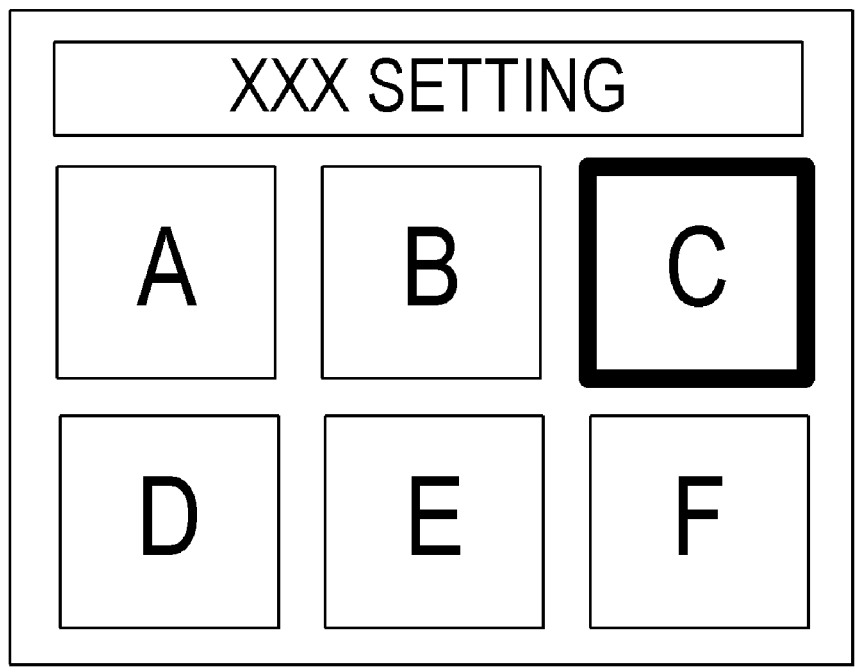

In S607, the system control unit 50 switches a selected candidate having been selected from a plurality of candidates of the setting value. The selected candidate is switched by a toggle (so that a plurality of candidates loop in a predetermined order). For example, the selected candidate is switched so that a state of the setting screen transitions from the state shown in FIG. 7A to the state shown in FIG. 7B. A candidate B is selected as a selected candidate in FIG. 7A and a candidate C is selected as a selected candidate in FIG. 7B. Due to the transition of the setting screen, the user can comprehend that the selected candidate has been switched from the candidate B to the candidate C.

In S608, the system control unit 50 resets a measured time of the system timer 53 (sets the measured time to 0). In addition, the system control unit 50 returns to S605 and once again starts time measurement by the system timer 53.

In S609, the system control unit 50 determines whether or not the measured time of the system timer 53 has exceeded a predetermined time. When the measured time has exceeded the predetermined time, processing advances to S610, but otherwise returns to S606. The measured time is a time during which an operation with respect to a same operation member as the operation member operated in S601 is not performed. When an operation member is operated during time measurement of the system timer 53, the measured time of the system timer 53 may be reset regardless of whether or not the operation member operated during the time measurement by the system timer 53 is the same as the operation member operated in S601. In such a case, a time of non-operation is measured by the system timer 53.

In S610, the system control unit 50 sets (determines) the selected candidate as a setting value by writing the selected candidate to the nonvolatile memory 56. When an operation member that differs from the operation member operated in S601 is operated during time measurement by the system timer 53, the system control unit 50 may set the selected candidate as the setting value regardless of the measured time of the system timer 53. When a state of each unit of the digital camera 100 changes, the system control unit 50 may set the selected candidate as the setting value regardless of the measured time of the system timer 53. In a similar manner to the first example, the user may be made capable of changing setting values using the four-way key 74 and the SET button 75.

In S608, the system control unit 50 hides the setting screen.

In S609, the system control unit 50 resets the measured time of the system timer 53.

According to the seventh example, a setting screen is displayed in response to a specific operation and a selected candidate and, consequently, setting values are switched in response to the specific operation in a state where the setting screen is being displayed. As a result, a function that is suitable for a user can be activated in response to a specific operation both in normal times and under specific circumstances. For example, the user can change (switch) a setting value to a desired value both in normal times and under specific circumstances.

A determination of whether or not specific circumstances are in place may be included in the photography mode processing shown in FIG. 6. For example, when the setting screen is being displayed, the system control unit 50 may switch the selected candidate in response to a specific operation under specific circumstances but not switch the selected candidate even if the specific operation is performed if not under the specific circumstances. When not under the specific circumstances (in normal times), for example, the user changes setting values using the four-way key 74 and the SET button 75 in a similar manner to the first example. In addition, the system control unit 50 hides the setting screen in response to the specific operation.

It should be noted that the various controls described above as controls to be performed by the system control unit 50 may be carried out by one piece of hardware or a plurality of pieces of hardware (for example, a plurality of processors or circuits) may control an entire apparatus by sharing processes.

In addition, while an embodiment the present invention has been described in detail, it is to be understood that the present invention is not limited to the specific embodiment and that various modes that do not constitute departures from the scope of the invention are also included in the present invention. Furthermore, the embodiment described above simply represents one embodiment of the present invention and the embodiment can also be combined with other embodiments.

Furthermore, while an example in which the present invention is applied to an imaging apparatus (a digital camera) has been described in the embodiment presented above, the present invention is not limited to this example and can be applied to any electronic device capable of displaying a setting screen in response to an operation by a user. For example, the present invention can be applied to a personal computer, a PDA, a mobile phone terminal, a mobile image viewer, a printer apparatus, a digital photo frame, a music player, a game device, an electronic book reader, and the like. The present invention can also be applied to a video player, a display apparatus (including a projection apparatus), a tablet terminal, a smartphone, an AI speaker, a domestic electrical appliance, a vehicle-mounted apparatus, and the like.

According to the present invention, an electronic device capable of activating a function that is suitable for a user in response to a specific operation can be provided.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-164983, filed on Oct. 13, 2022, which is hereby incorporated by reference herein in its entirety.

What is claimed is:

1. An electronic device comprising at least one memory and at least one processor which function as:
   a control unit configured to perform control so as to display a setting screen on a display in response to a specific operation on the electronic device, wherein
   under specific circumstances, the control unit performs control so as to switch setting values that are settable on the setting screen, in response to the specific operation, and
   when not under the specific circumstances, the control unit does not perform control so as to switch the setting values in response to the specific operation, and performs control so as to switch the setting values in response to an operation that differs from the specific operation.

2. The electronic device according to claim 1, wherein under the specific circumstances, the control unit performs control so as to switch the setting values without displaying the setting screen, in response to the specific operation.

3. The electronic device according to claim 1, wherein the specific circumstances are circumstances where the user is not able to perform an operation with respect to the setting screen.

4. The electronic device according to claim 1, wherein the specific circumstances are circumstances where a selfie is to be taken.

5. The electronic device according to claim 1, wherein the specific circumstances are circumstances where the display is turned toward a side of an object.

6. The electronic device according to claim 1, wherein a display surface of the display is a touch operation surface, and
the specific circumstances are circumstances where the user is not able to perform a touch operation with respect to the touch operation surface.

7. The electronic device according to claim 1, wherein a display surface of the display is a touch operation surface, and
the specific circumstances are circumstances with a setting of not accepting a touch operation with respect to the touch operation surface.

8. The electronic device according to claim 1, wherein the specific circumstances are circumstances where the specific operation is performed with respect to an external device that is capable of communicating with the electronic device.

9. The electronic device according to claim 8, wherein the external device is an external device where an operation with respect to the setting screen is not possible.

10. The electronic device according to claim 1, wherein the specific operation is an operation with respect to an operation member to which a function of displaying the setting screen is assigned.

11. The electronic device according to claim 1, wherein under the specific circumstances, the control unit performs control so as to switch types of setting values that are switching targets in a case where an operation time of the specific operation is longer than a threshold and performs control so as to switch the setting values in a case where the operation time is shorter than the threshold.

12. An electronic device comprising at least one memory and at least one processor which function as:
   a control unit configured to perform control so as to display a setting screen showing candidate selected from a plurality of candidates of a setting value on a display in response to a specific operation on the electronic device, wherein in a case where the setting screen is displayed, the control unit performs control so as to switch the selected candidate in response to the specific operation when under specific circumstances, and does not perform control so as to switch the selected candidates even if the specific operation is performed when not under the specific circumstances.

13. The electronic device according to claim 12, wherein the specific circumstances are circumstances where a selfie is to be taken.

14. The electronic device according to claim 12, wherein the specific circumstances are circumstances where the display is turned toward a side of an object.

15. The electronic device according to claim 12, wherein a display surface of the display is a touch operation surface, and the specific circumstances are circumstances where the user is not able to perform a touch operation with respect to the touch operation surface.

16. The electronic device according to claim 12, wherein a display surface of the display is a touch operation surface, and the specific circumstances are circumstances with a setting of not accepting a touch operation with respect to the touch operation surface.

17. The electronic device according to claim 12, wherein the specific circumstances are circumstances where the specific operation is performed with respect to an external device that is capable of communicating with the electronic device.

18. The electronic device according to claim 17, wherein the external device is an external device where an operation with respect to the setting screen is not possible.

19. A control method of an electronic device, comprising:
accepting an operation by a user; and
performing control so as to display a setting screen on a display in response to a specific operation, wherein
under specific circumstances, control is performed so as to switch setting values that are settable on the setting screen, in response to the specific operation, and
when not under the specific circumstances, control is not performed so as to switch the setting values in response to the specific operation, and control is performed so as to switch the setting values in response to an operation that differs from the specific operation.

20. A control method of an electronic device, comprising:
accepting an operation by a user; and
performing control so as to display a setting screen showing candidate selected from a plurality of candidates of a setting value on a display in response to a specific operation, wherein
in a case where the setting screen is displayed,
control is performed so as to switch the selected candidate in response to the specific operation when under specific circumstances, and
control is not performed so as to switch the selected candidates even if the specific operation is performed when not under the specific circumstances.

21. A non-transitory computer readable medium that stores a program, wherein the program causes a computer to execute a control method of an electronic device, the control method comprising:
accepting an operation by a user; and
performing control so as to display a setting screen on a display in response to a specific operation, wherein
under specific circumstances, control is performed so as to switch setting values that are settable on the setting screen, in response to the specific operation, and
when not under the specific circumstances, control is not performed so as to switch the setting values in response to the specific operation, and control is performed so as to switch the setting values in response to an operation that differs from the specific operation.

22. A non-transitory computer readable medium that stores a program, wherein the program causes a computer to execute a control method of an electronic device, the control method comprising:
accepting an operation by a user; and
performing control so as to display a setting screen showing candidate selected from a plurality of candidates of a setting value on a display in response to a specific operation, wherein
in a case where the setting screen is displayed,
control is performed so as to switch the selected candidate in response to the specific operation when under specific circumstances, and
control is not performed so as to switch the selected candidates even if the specific operation is performed when not under the specific circumstances.

* * * * *